US011295355B1

(12) United States Patent
Lu et al.

(10) Patent No.: US 11,295,355 B1
(45) Date of Patent: Apr. 5, 2022

(54) USER FEEDBACK VISUALIZATION

(71) Applicant: INTERNATIONAL BUSINESS MACHINES CORPORATION, Armonk, NY (US)

(72) Inventors: Cindy Han Lu, San Jose, CA (US); Thai Quoc Tran, San Jose, CA (US); Animesh Singh, Santa Clara, CA (US); Srinivas R. Brahmaroutu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/030,837

(22) Filed: Sep. 24, 2020

(51) Int. Cl.
*G06Q 30/02* (2012.01)
*G06Q 30/06* (2012.01)
*G06F 3/04842* (2022.01)
*G06T 11/60* (2006.01)
*G06F 40/30* (2020.01)
*G06F 17/00* (2019.01)

(52) U.S. Cl.
CPC ..... *G06Q 30/0282* (2013.01); *G06F 3/04842* (2013.01); *G06F 40/30* (2020.01); *G06Q 30/0623* (2013.01); *G06Q 30/0643* (2013.01); *G06T 11/60* (2013.01); *G06T 2200/24* (2013.01)

(58) Field of Classification Search
CPC .......... G06Q 30/0282; G06Q 30/0643; G06Q 30/0623; G06T 11/60; G06T 2200/24; G06F 3/04842; G06F 40/30
See application file for complete search history.

(56) References Cited

U.S. PATENT DOCUMENTS

| 8,818,788 | B1 | 8/2014 | Mihalik |
| 9,105,036 | B2 | 8/2015 | Mass |
| 9,336,528 | B2 | 5/2016 | Beaton |
| 9,965,474 | B2 | 5/2018 | Doherty |
| 2008/0215571 | A1 | 9/2008 | Huang |

(Continued)

FOREIGN PATENT DOCUMENTS

CN 107527231 A 12/2017

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Quoc A Tran
(74) *Attorney, Agent, or Firm* — Rakesh Roy

(57) ABSTRACT

A method, computer system, and a computer program product for user feedback visualization is provided. The present invention may include, receiving at least one image of a product from a user device. The present invention may also include, rendering a product representation of the product based on the received at least one image. The present invention may further include, registering a user-defined product feature associated with the rendered product representation. The present invention may also include, receiving a textual statement corresponding to a user opinion of the user-defined product feature. The present invention may also include, associating, based on natural language processing, at least one segment of the received textual statement with the registered user-defined product feature.

18 Claims, 10 Drawing Sheets

(56) References Cited

U.S. PATENT DOCUMENTS

| | | | |
|---|---|---|---|
| 2012/0117459 A1* | 5/2012 | DeHaven | G06F 40/143 |
| | | | 715/234 |
| 2014/0278786 A1 | 9/2014 | Liu-Qiu-Yan | |
| 2016/0196580 A1* | 7/2016 | Hong | G06Q 30/0269 |
| | | | 705/14.53 |
| 2017/0255986 A1* | 9/2017 | Herbst | G06Q 30/0282 |
| 2018/0082331 A1* | 3/2018 | Feldman | G06Q 30/0273 |
| 2019/0019094 A1 | 1/2019 | Mengle | |
| 2020/0226651 A1* | 7/2020 | Rachidi | G06K 9/6218 |
| 2020/0233898 A1* | 7/2020 | Barzelay | G06F 16/24578 |

OTHER PUBLICATIONS

Rohrer et al. "Practical Usability Rating by Experts (PURE): A Pragmatic Approach for Scoring Product Usability," Proceedings of the 2016 CHI Conference, Extended Abstracts on Human Factors in Computing Systems, May 2016, doi:10.1145/2851581.2851607, pp. 786-795.

Toubia et al. "Polyhedral Methods for Adaptive Choice-Based Conjoint Analysis," Journal of Marketing Research, vol. XLI, (Feb. 2004), pp. 116-131.

Zheng et al., "Multi-dimensional Sentiment Analysis for Large-Scale E-commerce Reviews," Database and Expert Systems Applications, 2014, Part II, LNCS 8645, pp. 449-463.

\* cited by examiner

USER FEEDBACK VISUALIZATION

BACKGROUND

The present invention relates generally to the field of computing, and more particularly to data visualization.

User feedback systems have been widely adopted in electronic commerce. Purchase decisions are often made based on balancing a product's positive reviews with the product's negative reviews and comparing those reviews against one or more other products' positive and negative reviews. As purchaser, it may be daunting to scroll through hundreds (and sometimes thousands) of reviews to make an informed buying decision.

SUMMARY

Embodiments of the present invention disclose a method, computer system, and a computer program product for user feedback visualization. The present invention may include, receiving at least one image of a product from a user device. The present invention may also include, rendering a product representation of the product based on the received at least one image. The present invention may further include, registering a user-defined product feature associated with the rendered product representation. The present invention may also include, receiving a textual statement corresponding to a user opinion of the user-defined product feature. The present invention may also include, associating, based on natural language processing, at least one segment of the received textual statement with the registered user-defined product feature.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
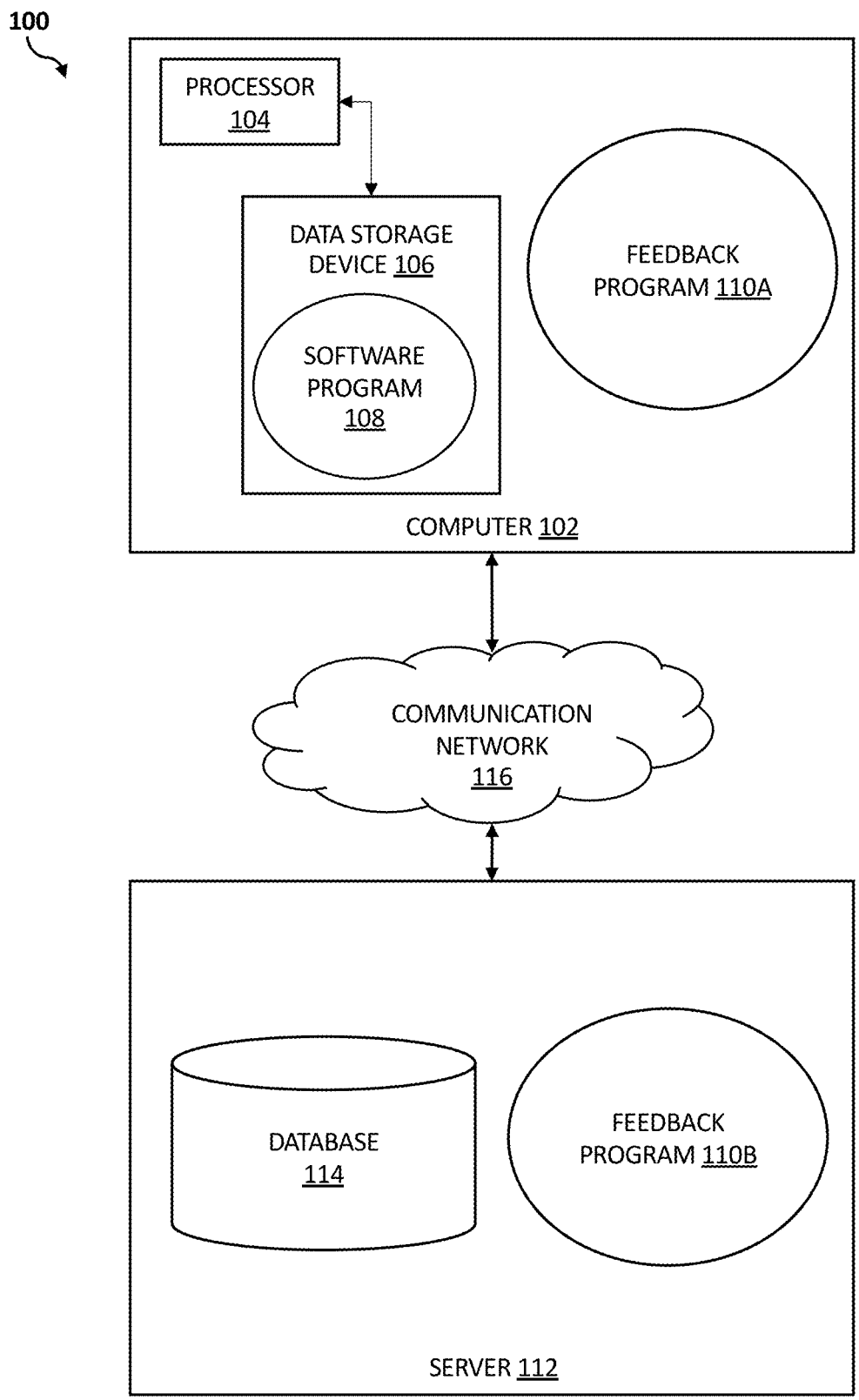
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for user feedback visualization. As such, the present embodiment has the capacity to improve the technical field of data visualization by visually rendering user feedback onto a pictorial representation of a product. More specifically, a feedback program may gather user feedback relating to a product offered at a point in time. The feedback program may implement natural language processing (NLP) to the user feedback to identify features of the product and categorize the identified features into likes (e.g., user approval), dislikes (e.g., user disapproval), and neutral comments. Then, the feedback program may apply a statistical accumulation to the categorized features of the product to generate a summarization assessment of the product. Thereafter, the feedback program may render the summarization assessment of the product onto a pictorial representation of the product.

As described previously, user feedback systems have been widely adopted in electronic commerce. Purchase decisions are often made based on balancing a product's positive reviews with the product's negative reviews and comparing those reviews against one or more other products' positive and negative reviews. As purchaser, it may be daunting to scroll through hundreds (and sometimes thousands) of reviews to make an informed buying decision. Moreover, user feedback referencing specific features of the product may become obfuscated by user feedback of the product as a whole.

Therefore, it may be advantageous to, among other things, provide a way to aggregate user-generated content or feedback identifying specific features of a product and visualize the aggregated feedback by rendering the feedback on pictorial representations of the product. It may also be advantageous to provide a user interface (UI) to enable a user to interact with a pictorial representation of a product to extract user feedback corresponding to specific features of the product. It may further be advantageous for the UI to enable the user to interactively define a feature of the product on the pictorial representation of the product and associate a user feedback with the user-defined feature of the product.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a feedback program 110*a*. The networked computer environment 100 may also include a server 112 that is enabled to run a feedback program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 8, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the feedback program 110a, 110b may interact with a database 114 that may be embedded in various storage devices, such as, but not limited to a computer/mobile device 102, a networked server 112, or a cloud storage service.

Figure 2:
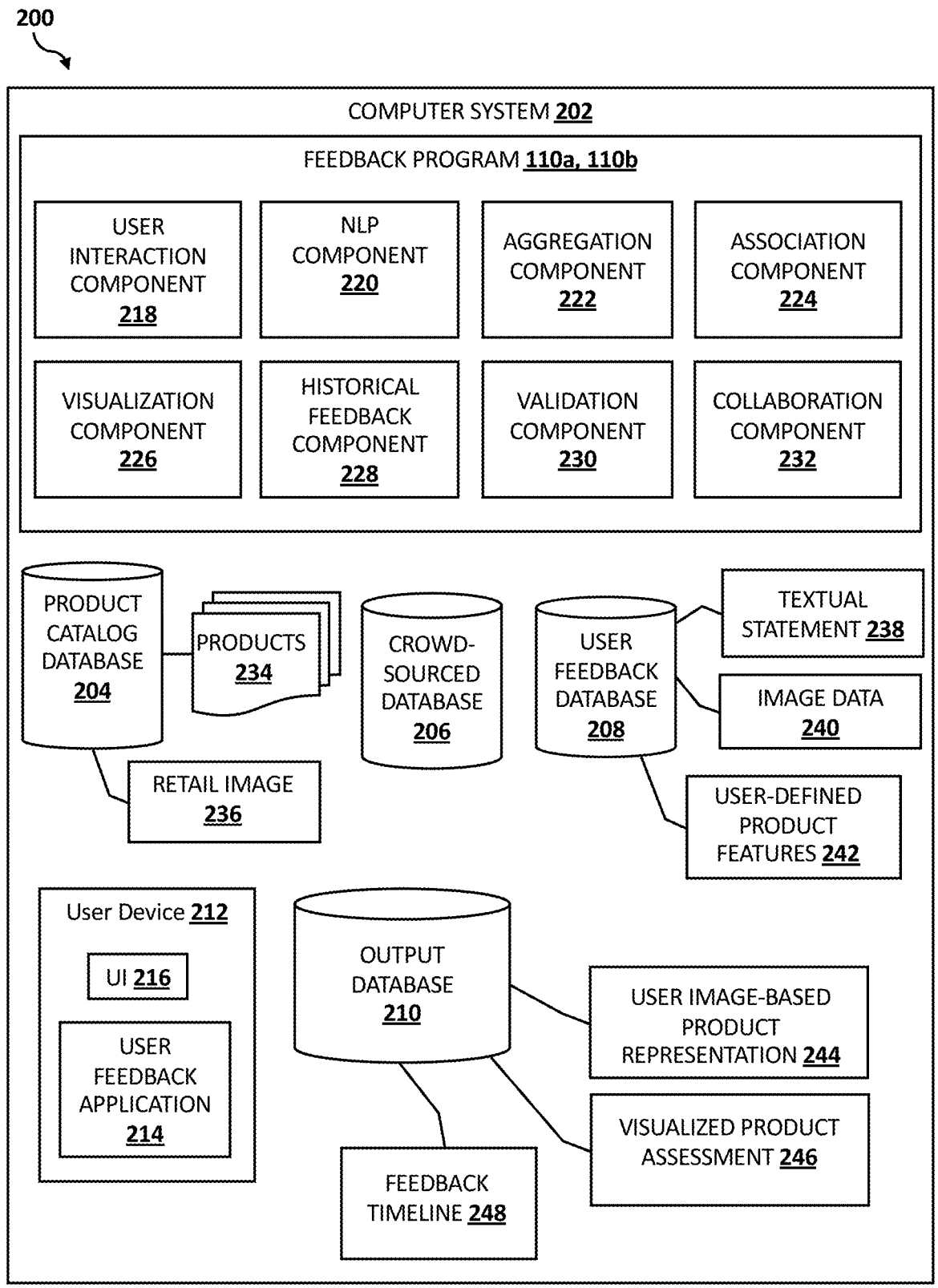
FIG. 2 is a schematic block diagram of a feedback environment according to at least one embodiment.

Referring now to FIG. 2, a schematic block diagram of a feedback environment 200 implementing the feedback program 110a, 110b according to at least one embodiment is depicted. According to one embodiment, the feedback environment 200 may include one or more components (e.g., client computer 102; server computer 112) of the computer environment 100 discussed above with reference to FIG. 1.

According to one embodiment, the feedback environment 200 may include a computer system 202 having a tangible storage device and a processor that is enabled to run the feedback program 110a, 110b. The computer system 202 may generally include one or more computing devices (e.g., a workstation, a personal computing device, a laptop computer, a desktop computer, a thin-client terminal, a tablet computer, a smart telephone, a smart watch or other smart wearable, or other electronic devices), a product catalog database 204, a crowd-sourced feedback database 206, a user feedback database 208, and an output database 210 linked through a communication network (e.g., communication network 116). In various embodiments, databases 204-210 may be distributed over multiple data storage devices included in the computer system 202, over multiple data storage devices external to the computer system 202, or a combination thereof. In other embodiments, databases 204-210 may be provided in a same data storage device included in the computer system 202 or in a same data storage device external to the computer system 202.

In some embodiments, the environment 200 may include fewer or additional components in various configuration that differ from the configuration illustrated in FIG. 2. For example, in some embodiments, computer system 202 may utilize cluster computers and components that act as a single pool of seamless resources when accessed through communication network (e.g., communication network 116). In various embodiments, environment 200 may include one or more intermediary devices.

According to one embodiment, the feedback program 110a, 110b may be utilized by an E-commerce service, such as, for example, an online marketplace, to provide user feedback visualizations for products being sold to users of the online marketplace. The E-commerce service may also implement the feedback program 110a, 110b to receive user feedback from users to generate user feedback visualizations for products being sold on their online marketplace.

According to one embodiment, the one or more computing devices of computer system 202 may include a user device 212 (e.g., client computer 102) associated with a user of the feedback program 110a, 110b. In one embodiment, the user may interact with the user device 212 to view aggregated user feedback visually rendered on a pictorial representation of a product, as will be further detailed in this disclosure. In other embodiments, the user may interact with the user device 212 to input user feedback corresponding to specific features of a product, as will be further detailed in this disclosure. In one embodiment, the feedback program 110a, 110b may include a user feedback application 214 which may be enabled to run on the user device 212 using a processor (e.g., processor 104) of the user device 212. The user simulation application 214 may include a web browser application or a dedicated device application enabled to receive user feedback for visually rendering a pictorial representation of a product and display user feedback visually rendered on a pictorial representation of a product. According to one embodiment, user device 212 may also include a user interface (UI) 216. UI 216 may include human machine interfaces, such as, for example, a touchscreen, a keyboard, a cursor-control device (e.g., a mouse, a touchpad, a stylus), one or more buttons, a microphone, a speaker, and/or a display (e.g., a liquid crystal display (LCD)). For example, in some embodiments, user device 212 may include a display configured to enable graphical user interfaces (GUI) that allow a user (e.g., purchaser of a product) to request a product's user feedback and view the user feedback visually rendered on the pictorial representation of the product. The GUI may also enable the user to navigate the pictorial representation of the product and select individual product features to view an aggregated user feedback of the selected product feature. In some embodiments, the GUI may enable a user (e.g., reviewer of a product) to define a product feature by selecting a rendering of the product feature on a pictorial representation of the product. The GUI may then enable the user to insert text corresponding to user feedback linked to the user-defined product feature.

In one embodiment, the feedback program 110a, 110b may include a single computer program or multiple program modules or sets of instructions being executed by the processor of the computer system 202. The feedback program 110a, 110b may include routines, objects, components, units, logic, data structures, and actions that may perform particular tasks or implement particular abstract data types. The feedback program 110a, 110b may be practiced in distributed cloud computing environments where tasks may be performed by remote processing devices which may be linked through the communication network. In one embodiment, the feedback program 110a, 110b may include program instructions that may be collectively stored on one or more computer-readable storage media.

According to one embodiment, the feedback program 110a, 110b may include various components, such as, for example, a user interaction component 218, a natural language processing (NLP) component 220, an aggregation component 222, an association component 224, a visualization component 226, a historical feedback component 228, a validation component 230, and a collaboration component 232. In some embodiments, the functionality described herein as being performed by respective components 220-232, may be distributed among multiple software components. Also, in some embodiments, computer system 202 may access the functionality provided by the respective components 220-232 through one or more application programming interfaces (APIs).

According to one embodiment, the product catalog database 204 may include a list of products 234 that may be provided for sale to the user by an E-commerce service. In one embodiment, the feedback program 110a, 110b may enable the user (e.g., via user device 212) to provide feedback and/or review feedback corresponding to one or more products 234 included in the product catalog database 204. In various embodiments, the product catalog database 204 may also include one or more retail images 236 of the products 234. In various embodiments, retail image 236 may also be referred to interchangeably as a retail product image, a retail image-based product representation, and a default pictorial representation. In one embodiment, Retail image 236 may include two-dimensional (2-D) and/or three-dimensional (3-D) pictorial representations or models of the products 234.

According to one embodiment, the crowd-sourced database 206 may include user comments corresponding to one or more products 234 from various channels or sources. In some embodiments, the crowd-sourced database 206 may include user comments gathered from open sources such as social media or public product feedback sources. In other embodiments, the crowd-sourced database 206 may include user comments gathered from a product manufacturer's own feedback source or other private sources. In some embodiments, the feedback program 110a, 110b may use the user comments stored in the crowd-sourced database 206 to populate user feedback corresponding to the products 234.

According to one embodiment, the user feedback database 208 may include one or more textual statements 238, one or more image data 240, and one or more user-defined product features 242 received from user device 212. In one embodiment, the textual statements 238 may include natural language input corresponding to: a description and/or opinion of product 234 as a whole, a description and/or opinion of one or more user-defined product features 242 of product 234, or a description and/or opinion of both—product 234 as a whole and one or more user-defined product features 242 of product 234. In one embodiment, image data 240 may include one or more photographs of an object (e.g., product 234 or components thereof) received from the user device 212. As will be described further, in embodiments, the feedback program 110a, 110b may implement image processing techniques to generate pictorial representations of a product 234 based on the image data 240 received from user device 212 corresponding to the product 234. These pictorial representations of the products 234 may be referred to as a user image-based product representation 244 and stored in output database 210.

According to one embodiment, users of the feedback program 110a, 110b may not be limited to commenting on a static list of product features provided by, for example, the manufacturer of the product 234 and/or the online marketplace selling the product 234. Instead, as previously described, the feedback program 110a, 110b may enable receiving user-defined product features 242. According to one embodiment, a product feature may include any rendering of a physical component (e.g., internal or external component) of a physical object (e.g., product 234), including a functional component. The feedback program 110a, 110b may enable the user to graphically select or annotate (e.g., via cursor control device; touchscreen) a portion of the pictorial representation (e.g., retail image 236; user image-based product representation 244) of the product 234 to dynamically register the selected portion as the user-defined product feature 242. In one embodiment, the feedback program 110a, 110b may electronically link the user-defined product feature 242 (e.g., the selected pixels) to segments of the textual statement 238 such that the descriptions/opinions in the textual statement 238 may be associated with the user-defined product feature 242. In some embodiments, the feedback program 110a, 110b may enable the user to enter a feature name for the user-defined product feature 242. In other embodiments, the feedback program 110a, 110b may automatically determine the feature name for the user-defined product feature 242 based on one or more segments of the textual statement 238 associated with the user-defined product feature 242.

According to one embodiment, the feedback program 110a, 110b may implement the user interaction component 218 to enable the user (e.g., via UI 216 of user device 212) to interact directly with the pictorial representations (e.g., retail image 236; user image-based product representation 244) of the product 234. In one embodiment, the user may directly manipulate (e.g., via rotation control; zoom control) the pictorial representations of the product 234 (e.g., via UI 216 of user device 212) to glean user feedback information regarding the products 234. For example, the user may zoom in and pinpoint a product feature (e.g., in the pictorial representation) to extract user feedback information corresponding to that product feature. In one embodiment, the user interaction component 218 my enable selecting individual product features to view an aggregated feedback corresponding to the selected product feature and may further enable selecting the aggregated feedback to view all the user opinions that were used in aggregating the feedback. In at least one embodiment, the user interaction component 218 may enable the user to input the textual statements 238, image data 240, and user-defined product features 242. In various embodiments, the user interaction component 218 may provide a feature defining tool which may be used directly on the pictorial representation of the product 234 to dynamically generate the user-defined product feature 242.

According to one embodiment, the feedback program 110a, 110b may implement the NLP component 220 to label each word in the textual statement 238 with an associated parts-of-speech tag (e.g., PoS tagging). In one embodiment, the NLP component 220 may first breakdown or tokenize each word in the textual statement 238. Then, PoS tagging may be used to label each word (e.g., token) as, for example, a noun, verb, adjective, adverb, preposition, conjunction, pronoun, or interjection based on, for example, whether the word is capitalized, whether the word is the first/last word of the sentence, and the surrounding words. In one embodiment, the PoS tagging may analyze the relationship of each of the words to determine the appropriate label for each word. For example, the PoS tagging may determine that a word located before a verb that modifies the verb may be considered an adverb. According to one embodiment, the NLP component 220 may be used to determine (e.g., infer)

the user's opinion or perception as relating to the product 234 based on textual statement 238. In one embodiment, the NLP component 220 may utilize sentiment analysis and topic modeling techniques to characterize an orientation of the sentiment expressed in the user's opinions. In embodiments, the sentiment orientation may include, the polarity, tone, and/or emotions expressed in the user's opinions. In various embodiments, the sentiment orientation may be clustered into three main categories: positive, negative, and neutral sentiment. In at least one embodiment, the sentiment orientation may be clustered into any number of categories. Using topic modeling, the NLP component 220 may draw out and identify the product features or components of product 234 mentioned in the textual statement 238. According to one embodiment, the association component 224 may be implemented to link the sentiment to the respective product features or components. In at least one embodiment, the association component 224 may also be implemented to link the user-defined product feature 242 to the textual statement 238 corresponding to the user-defined product feature 242.

According to one embodiment, the aggregation component 222 may receive the textual statement 238 tagged with one or more topics (e.g., product feature) and corresponding sentiment orientations. The aggregation component 222 may apply a statistical accumulation of the sentiment orientations for each product feature to determine an aggregated feedback rating value or score (e.g., three out of five) based on the sentiment or overall evaluation of the product feature. According to one embodiment, the visualization component 226 may render the aggregated feedback rating value corresponding to the product feature onto the pictorial representation of the product 234 as a rating visualization (e.g., three out of five stars). Various other rating visualization formats are also contemplated (e.g., using colors). In one embodiment, the visualization component 226 may map the aggregated feedback rating value (e.g., using the rating visualization) onto the pictorial representation of the product 234 in a location proximate the corresponding product feature. In one embodiment, the feedback program 110a, 110b may output a visualized product assessment 246 including one or more rating visualizations projected onto pictorial representation of the product 234 in the locations proximate the corresponding product features. The visualized product assessment 246 corresponding to each product 234 may be stored in the output database 210. In one embodiment, the feedback program 110a, 110b may present the visualized product assessment 246 to the user in response to the user requesting to read user feedback corresponding to a product 234 and/or input user feedback corresponding to the product 234.

According to one embodiment, the visualization component 226 may also use the image data 240 uploaded by the user device 212 to generate the user image-based product representation 244 of product 234. In one embodiment, the visualization component 226 may implement image processing techniques to render the user image-based product representation 244 (e.g., 2-D pictorial model; 3-D pictorial model) of the product 234 using the image data 240. In one embodiment, if a product 234 includes one or more user image-based product representations 244, those may be implemented to replace the retail images 236 of product 234. In other embodiments, user image-based product representations 244 may exist for only specific features of product 234. In such embodiments, the user image-based product representations 244 may replace the retail images 236 for only those specific features of product 234. In other embodiments, the retail images 236 may be selectable by the user to display the corresponding user image-based product representations 244. According to one embodiment, the pictorial model provided by the user image-based product representation 244 may improve over time as more image data 240 is fed into the visualization component 226.

According to one embodiment, the user image-based product representations 244 may enable the user to visually track how a product 234 has changed overtime. In one embodiment, the historical feedback component 228 may use the image data 240 as longitudinal data, that is, a series of repeated observations of a respect feature of product 234 over period of time (e.g., past to present). Using this longitudinal data, the historical feedback component 228 may determine a version history of product 234 (or specific features of product 234) and build a feedback timeline 248 (stored in output database 210) to enable users to dynamically and visually compare how various versions of the product 234 or specific features thereof has changed over time. In one embodiment, the feedback timeline 248 may enable users to track the improvements made to the features of product 234. Users may be enabled to determine if it is worth buying a new version of product 234, or if an older version is in fact the better product 234 to buy. In one embodiment, the feedback timeline 248 may include a slider which may be manipulated to visualize the product representation from the past to the present. Manipulating the slider from a past timeframe to a present timeframe may dynamically update the product representation to show how product 234 or specific features thereof may age overtime and its lifespan. In one embodiment, the historical feedback component 228 may provide a feedback loop of information to the manufacturer to help them prioritize what features of product 234 need to be fixed or updated in future versions of product 234.

According to one embodiment, the validation component 230 may use the image data 240 uploaded by the user to validate the user's feedback. In one embodiment, the validation component 230 may be implemented such that the user feedback may not become effective unless proven to generate a confidence score. In one embodiment, the validation component 230 may generate the confidence score for user feedback which includes image data 240 uploaded by the user device 212. In various embodiments, user feedback which includes image data 240 may be given more weight when calculating the aggregated feedback rating value by the aggregation component 222.

According to one embodiment, the collaboration component 232 may enable the user to share the visualized product assessment 246 of a particular product 234 to one or more other users, for example, through a social networking platform. In one embodiment, the visualized product assessment 246 shared by the user may include their user image-based product representation 244. In addition, the visualized product assessment 246 shared by the user may only include their user-defined product features 242 and corresponding rating visualizations (e.g., for features which the user had quality issues with). In one embodiment, the collaboration component 232 may enable the user to prompt additional users to engage with their visualized product assessment 246, for example, to view the existing user feedback and/or to receive additional feedback from the additional users. In one embodiment, the collaboration component 232 may update the visualized product assessment 246 based on the input received from the additional users.

In at least one embodiment, the collaboration component 232 may enable the user to communicate how they fixed a problem with the product (e.g., communicating that replacing a bolt would make the product work more efficiently for a specific scenario). This may enable users to customize products to meet specific needs and share that customization with other users. In one embodiment, the collaboration component 232 may also enable the user to link to other parts which may be used to fix a broken product feature.

Figure 3:
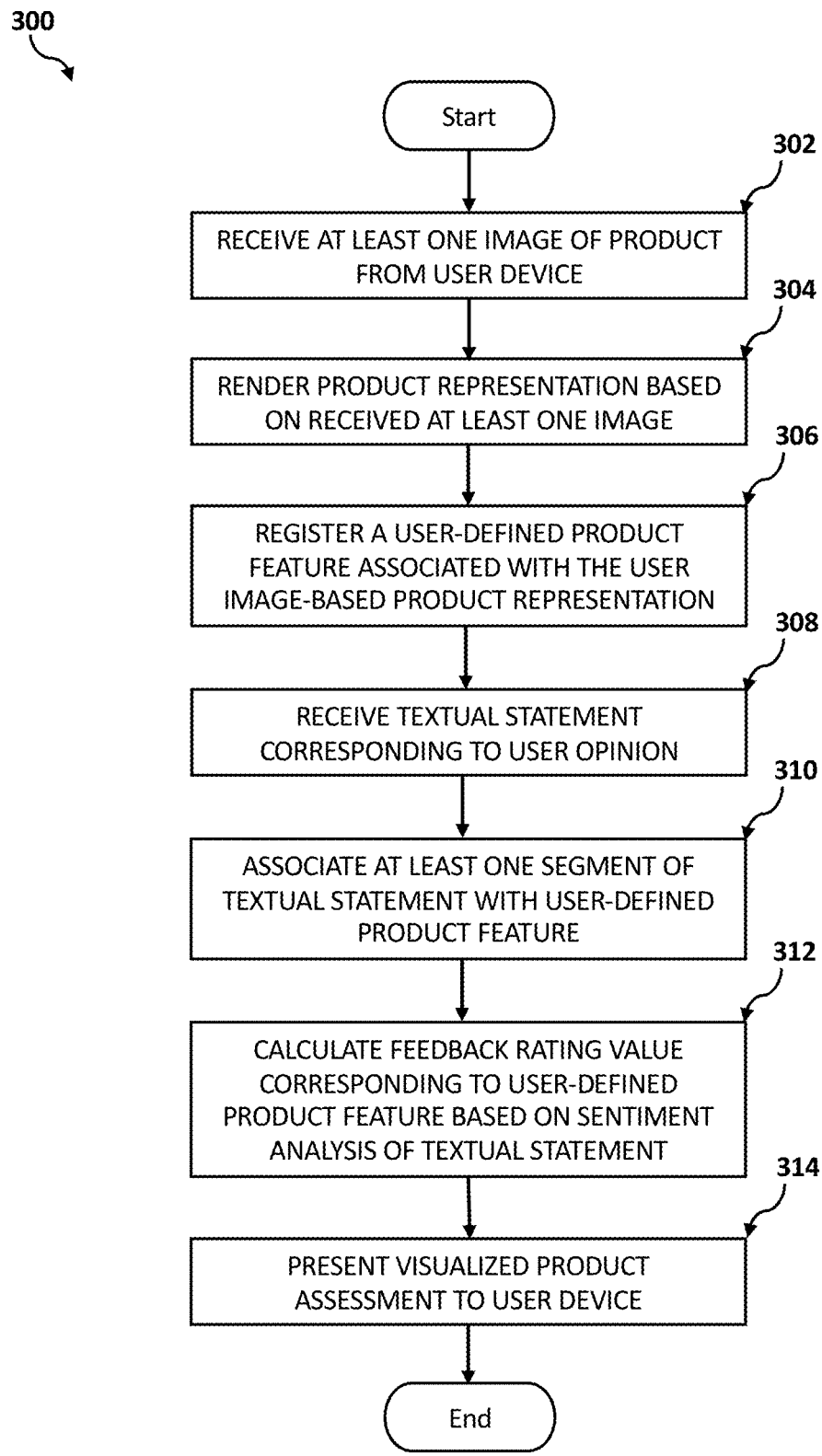
FIG. 3 is an operational flowchart illustrating an exemplary visualized feedback process according to at least one embodiment.

Referring now to FIG. 3, an operational flowchart illustrating an exemplary visualized feedback process 300 implemented by the feedback program 110a, 110b according to at least one embodiment is depicted.

At 302, an image of a product is received from a user device. According to one embodiment, the feedback program 110a, 110b may enable a user to select a product for which the user would like to leave feedback (e.g., feedback input process). In one embodiment, the feedback input process may include a prompt for the user to upload one or more images of the product using the user device. For example, the user may use a smartphone camera to capture one or more photographs of the product or product component and transmit the images to the feedback program 110a, 110b.

Then at 304, a product representation is rendered based on the images received from the user device. According to one embodiment, the feedback program 110a, 110b may implement image processing and visualization techniques to generate a user image-based product representation using image data extracted from the images received from the user device. In one embodiment, the product representation generated by the feedback program 110a, 110b may include a 2-D pictorial model or a 3-D pictorial model. In one embodiment, the feedback program 110a, 110b may use image analysis to compare the user image-based product representation of the product with a retail image-based product representation (e.g., default pictorial representation of the product) to determine which portions of the product were included in the user image-based product representation. In some embodiments, the feedback program 110a, 110b may enable the user image-based product representation to replace the default pictorial representation of the product or specific portions of the product reflected in the user image-based product representation. In other embodiments, the feedback program 110a, 110b may enable the default pictorial representation of the product to be selectable by the user to display the corresponding user image-based product representation.

Then at 306, a user-defined product feature associated with the user image-based product representation is registered. According to one embodiment, the feedback program 110a, 110b may enable the user to define one or more product features for which to provide feedback. In one embodiment, the feedback program 110a, 110b may enable the user to graphically select or annotate (e.g., via cursor control device; touchscreen) a portion of the user image-based product representation. Responsive to receiving the selection from the user device, the feedback program 110a, 110b may dynamically register the selected portion (e.g., selected pixels) of the user image-based product representation as the user-defined product feature. In at least one embodiment, the feedback program 110a, 110b may prompt and/or enable the user to define the user-defined product feature with reference to the retail image-based product representation (e.g., default pictorial representation of the product). Responsive to receiving the selection from the user device, the feedback program 110a, 110b may dynamically register the selected portion (e.g., selected pixels) of the retail image-based product representation as the user-defined product feature. In various embodiments, after registering the user-defined product feature, the feedback program 110a, 110b may then prompt the user to upload one or more images of the user-defined product feature using the user device.

Then at 308, a textual statement corresponding to a user opinion is received. According to one embodiment, once the feedback program 110a, 110b has determined the user-defined product feature for which the user would like to provide feedback, the feedback program 110a, 110b may generate a text input field to prompt the user to enter a textual statement corresponding the user opinion associated with the user-defined product feature. In some embodiments, the feedback program 110a, 110b may enable the user to enter a textual statement corresponding the user opinion associated with the whole product in general—without first defining the product feature for which the user would like to provide feedback.

Then at 310, at least one segment of the textual statement is associated with the user-defined product feature. In one embodiment, the feedback program 110a, 110b may implement NLP techniques such as, for example, PoS tagging and topic modeling to extract segments in the textual statement corresponding to user opinions and product features or components, as described previously with reference to FIG. 2. In one embodiment, the feedback program 110a, 110b may electronically link the user-defined product feature (e.g., the selected pixels) to the segments of the textual statement including the user opinions associated with the user-defined product feature. In embodiments where the product feature may not be defined by the user and the user may input text associated with the whole product in general, the feedback program 110a, 110b may implement NLP and other machine learning techniques to identify the product features mentioned in the text statement and locate the identified product features on product representation (e.g., default pictorial representation of the product).

Then at 312, a feedback rating value corresponding to the user-defined product feature is calculated based on sentiment analysis of the textual statement. According to one embodiment, the feedback program 110a, 110b may utilize sentiment analysis techniques to characterize an orientation of the sentiment expressed in the user opinions. In various embodiments, a sentiment orientation may be clustered into categories, such as, for example, a positive sentiment, a negative sentiment, and a neutral sentiment. Each sentiment may include a corresponding feedback rating value. For example, a positive sentiment may include the highest feedback rating value, a negative sentiment may include the lowest feedback rating value, and a neutral sentiment may include an intermediate feedback rating value.

According to one embodiment, the feedback program 110a, 110b may receive multiple feedbacks corresponding to the same product feature (e.g., as defined by multiple users). In one embodiment, the feedback program 110a, 110b may determine the sentiment orientation expressed in each user opinion and the resulting feedback rating value as described above. Then, the feedback program 110a, 110b may calculate a statistical accumulation of the feedback rating value (e.g., based on sentiment orientation) for each product feature to determine an aggregated feedback rating value or score, as described previously with reference to FIG. 2.

Thereafter at 314, a visualized product assessment is presented to the user device. According to one embodiment, the feedback program 110a, 110b may render the aggregated feedback rating value corresponding to the product feature onto the product representation (e.g., user image-based product representation or retail image-based product representation) of the as a rating visualization, as described previously with reference to FIG. 2.

In one embodiment, the feedback program 110a, 110b may map the aggregated feedback rating value (e.g., using the rating visualization) onto the product representation in a location proximate the pixels of the product representation corresponding to user-defined product feature. In one embodiment, the feedback program 110a, 110b may output a visualized product assessment including one or more rating visualizations projected onto the product representation in the locations proximate the user-defined product features. In one embodiment, the feedback program 110a, 110b may dynamically update the visualized product assessment based on the feedback received from the user. The feedback program 110a, 110b may then transmit the visualized product assessment including the user's feedback to the user device.

Figure 4:
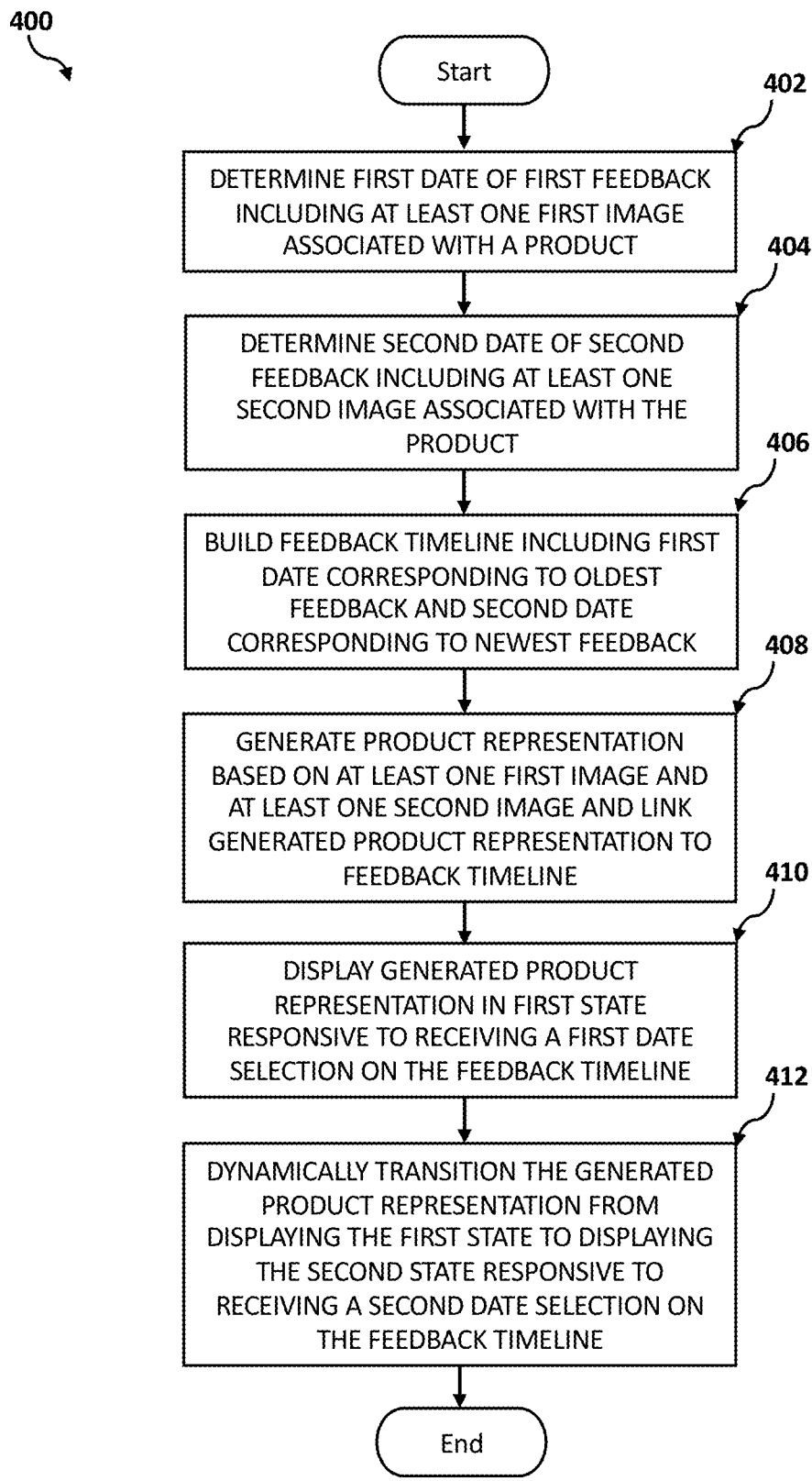
FIG. 4 is an operational flowchart illustrating an exemplary historical feedback process according to at least one embodiment.

Referring now to FIG. 4, an operational flowchart illustrating an exemplary historical feedback process 400 used by the feedback program 110a, 110b according to at least one embodiment is depicted.

At 402, a first date of a first feedback including at least one first image associated with a product is determined. According to one embodiment, the feedback program 110a, 110b may determine the first feedback to include an oldest (e.g., earliest) feedback corresponding to the product. In one embodiment, the product may include a specific feature of the product. In response to receiving the first feedback which includes at least one first image of the product and/or the specific feature of the product, the feedback program 110a, 110b may store the date on which the first feedback is received as the first date. In one embodiment, the feedback program 110a, 110b may store a full date (e.g., month/day/year). In other embodiments, the feedback program 110a, 110b may store a partial date (e.g., month/year or just the year). In one embodiment, the first image may correspond to at least one oldest (e.g., earliest) image of the product (e.g., specific feature of the product) received from the user device.

Then at 404, a second date of a second feedback including at least one second image associated with the product is determined. According to one embodiment, the feedback program 110a, 110b may determine the second feedback to include a newest (e.g., most recent or current) feedback corresponding to the same product and/or the same specific feature of the product. In response to receiving the second feedback which includes at least one second image of the product and/or the specific feature of the product, the feedback program 110a, 110b may store the date (e.g., as month/day/year; month/year; just year) on which the second feedback is received as the second date. In one embodiment, the second image may correspond to at least one newest (e.g., most recent or current) image of the product (e.g., specific feature of the product) received from the user device.

Then at 406, a feedback timeline is built including the first date of the oldest feedback and the second date of the newest feedback. According to one embodiment, the feedback program 110a, 110b may generate the feedback timeline as a graphical and selectable representation of the various dates from the past to the present for which visual feedback is available from the users. According to one embodiment, the feedback program 110a, 110b may generate respective feedback timelines for different versions of the product and/or specific feature of the product to enable the user to dynamically compare and contrast the different versions.

Then at 408, a product representation based on the at least one first image and the at least one second image of the product is generated and linked to the feedback timeline. In one embodiment, the product representation may be referred to as the user image-based product representation and may include a 2-D pictorial representation or a 3-D pictorial representation of the product and/or specific feature of the product. In on embodiment, the product representation generated by the feedback program 110a, 110b may include a dynamic product representation. According to one embodiment, the generated product representation may include a first state for visualizing the generated product representation based on the at least one first image. In the first state, the generated product representation may look like product in the oldest (e.g., earliest) image received from the user. It is contemplated that the first state may represent the product when it was relatively new. According to another embodiment, the generated product representation may include a second state for visualizing the generated product representation based on the at least one second image. In the second state, the generated product representation may look like product in the newest (e.g., most recent or current) image received from the user. It is contemplated that the second state may represent the product when it was relatively old or after a period of time of use has passed from the first state of the product.

Then at 410, the generated product representation is displayed in the first state responsive to receiving a first date selection on the feedback timeline. As noted above, the feedback program 110a, 110b may link the generated product representation to the feedback timeline. Accordingly, in response to the user interacting with the feedback timeline and selecting the first date on the feedback timeline, the feedback program 110a, 110b may render the generated product representation to visualize the first state of the generated product representation. As such, the feedback program 110a, 110b may enable the user to visualize how the product and/or specific feature of the product looked when it was relatively new.

Thereafter at 412, the generated product representation is dynamically transitioned from displaying the first state to displaying the second state responsive to receiving a second date selection on the feedback timeline. According to one embodiment, in response to the user interacting with the feedback timeline and selecting the second date on the feedback timeline, the feedback program 110a, 110b may dynamically render the generated product representation to visualize the second state of the generated product representation. As such, the feedback program 110a, 110b may enable the user to visualize a transition of the product and/or specific feature of the product from when it was relatively new to when it is relatively old and how it changes over time with use.

Figure 5:
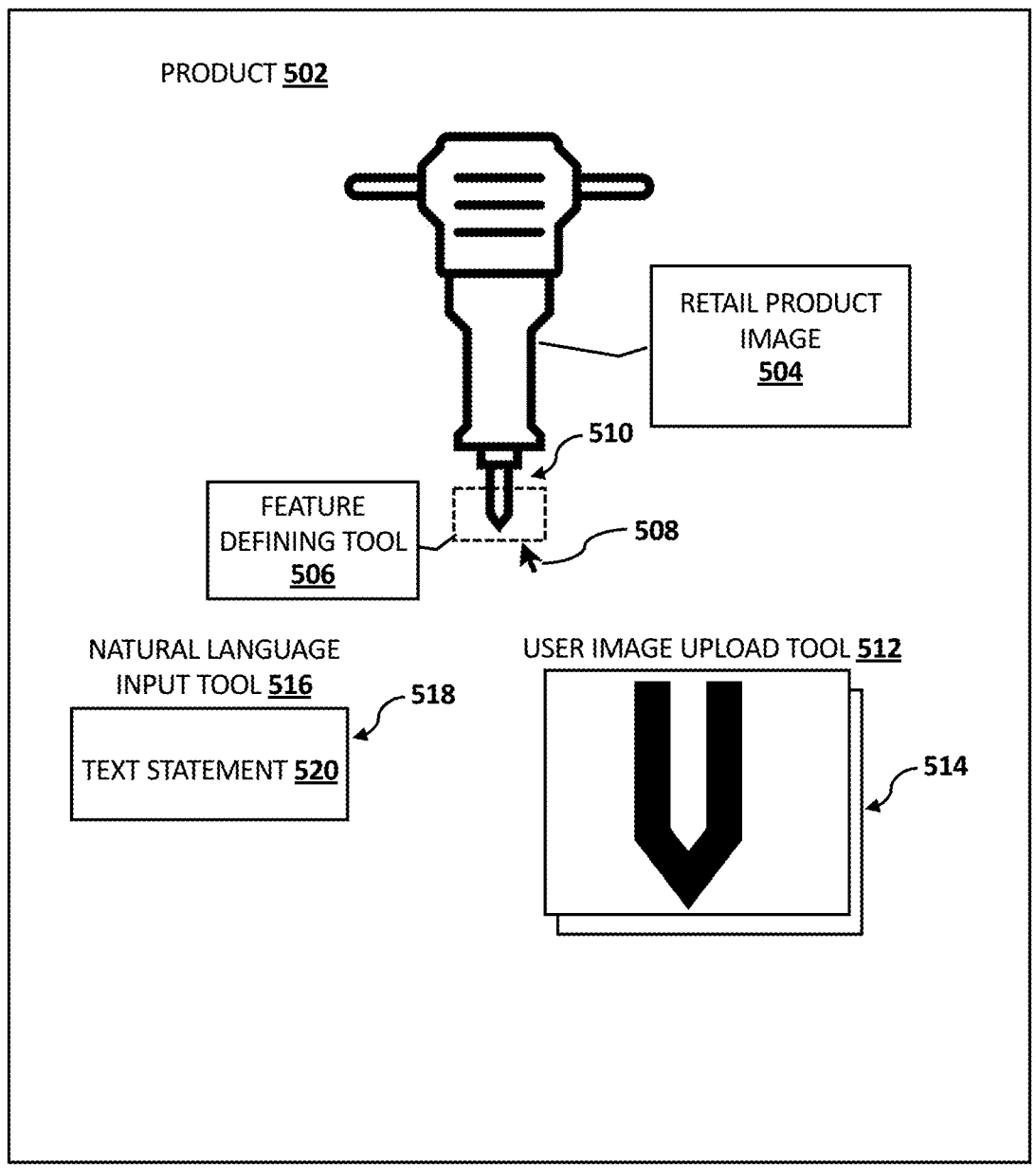
FIG. 5 is a block diagram illustrating a feedback receiving user interface according to at least one embodiment.

Referring now to FIG. 5, an exemplary block diagram illustrating a feedback receiving UI 500 implemented by the feedback program 110a, 110b according to at least one embodiment is depicted.

According to one embodiment, the feedback program 110a, 110b may provide the feedback receiving UI 500 to the user device to enable the user to leave feedback regarding one or more products. For example, the feedback program 110a, 110b may enable a user to select a product 502 for which the user would like to leave feedback. In one embodiment, the feedback program 110a, 110b may display a retail product image 504 (e.g., default pictorial representation of the product 502) in the feedback receiving UI 500.

As described previously with reference to FIG. 3, in at least one embodiment, the feedback program 110a, 110b may prompt and/or enable the user to define a user-defined product feature with reference to the retail product image 504. In one embodiment, the feedback receiving UI 500 may include a feature defining tool 506 as illustrated in FIG. 5. In one embodiment, the feature defining tool 506 may provide a pixel selection or annotation function which may be implemented, for example, by a cursor control device 508. In response to the user interacting with the feature defining tool 506 to select a portion of the retail product image 504, the feedback program 110a, 110b may register the selected portion (e.g., the corresponding pixels) as a user-defined product feature 510.

According to one embodiment, the feedback receiving UI 500 may include a user image upload tool 512 as illustrated in FIG. 5. In various embodiments, after registering the user-defined product feature 510, the feedback program 110a, 110b may then prompt the user (e.g., via user image upload tool 512) to upload one or more images of the user-defined product feature 510 using the user device. In one embodiment, the user device may transmit one or more images 514 of the user-defined product feature 510 to the feedback program 110a, 110b. According to one embodiment, the feedback program 110a, 110b may use the images 514 to generate a user image-based product representation (e.g., 2-D or 3-D pictorial model) of the user-defined product feature 510, as described previously with reference to FIGS. 2 and 3.

According to one embodiment, the feedback receiving UI 500 may include a natural language input tool 516 as illustrated in FIG. 5. In one embodiment, the natural language input tool 516 may generate a text input field 518 to prompt the user to enter text feedback using the user device. In response, the user may enter a textual statement 520 corresponding the user opinion associated with product 502 and/or the user-defined product feature 510. As described previously with reference to FIGS. 2 and 3, the feedback program 110a, 110b may employ NLP techniques to associate segments of the textual statement 520 to the product 502 and/or the user-defined product feature 510 and determine the sentiment of the user corresponding to the product 502 and/or the user-defined product feature 510.

Figure 6:
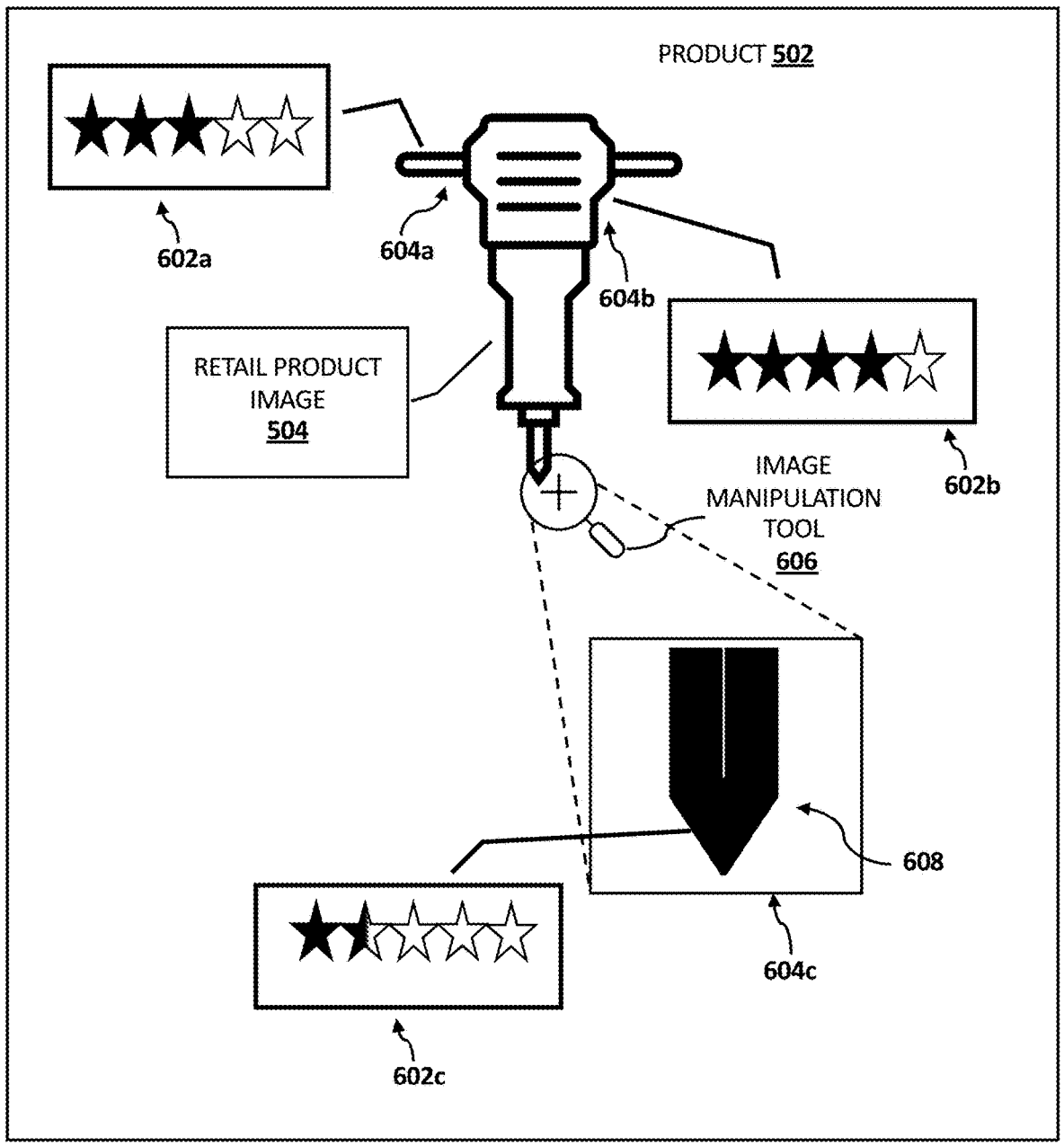
FIG. 6 is a block diagram illustrating a feedback displaying user interface according to at least one embodiment.

Referring now to FIG. 6, an exemplary block diagram illustrating a feedback displaying UI 600 implemented by the feedback program 110a, 110b according to at least one embodiment is depicted.

According to one embodiment, the feedback program 110a, 110b may provide the feedback displaying UI 600 to the user device to enable the user to interact with a visual product assessment of one or more products. For example, the feedback program 110a, 110b may enable a user to select the product 502 for which the user would like to view feedback. In one embodiment, the feedback program 110a, 110b may display the retail product image 504 (e.g., default pictorial representation of the product 502) in the feedback displaying UI 600. According to one embodiment, the feedback program 110a, 110b may render one or more rating visualizations 602a-602c projected onto the retail product image 504 in one or more locations proximate corresponding user-defined product features 604a-604c.

According to one embodiment, the feedback displaying UI 600 may include an image manipulation tool 606 as illustrated in FIG. 6. In one embodiment, the feedback program 110a, 110b may implement the image manipulation tool 606 to enable the user to interact directly with the pictorial representation (e.g., retail product image 504) of the product 502. In the example illustrated in FIG. 6, the image manipulation tool 606 may provide zoom control. The user may interact with the image manipulation tool 606 and zoom in on a portion of the retail product image 504. In response, the feedback displaying UI 600 may magnify the portion of the retail product image 504 pinpointed by the image manipulation tool 606 and dynamically display the rating visualization 602c associated with the corresponding user-defined product feature 604c. In one embodiment, the feedback displaying UI 600 may also display a product representation 608 of the user-defined product feature 604c generated based on receiving one or more images of the user-defined product feature 604c from other users, as described in FIG. 5.

Figure 7:
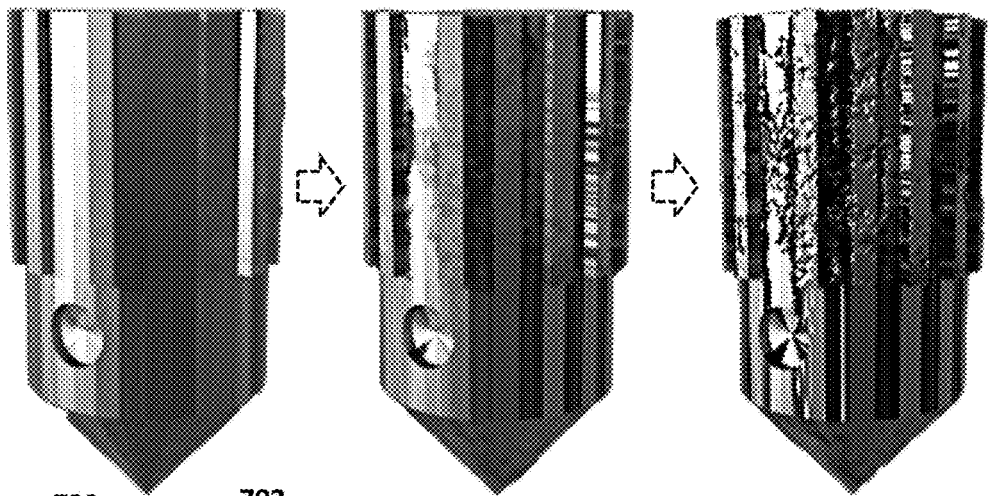
FIG. 7 is a block diagram illustrating a historical feedback tracking user interface according to at least one embodiment.
Figure 7:
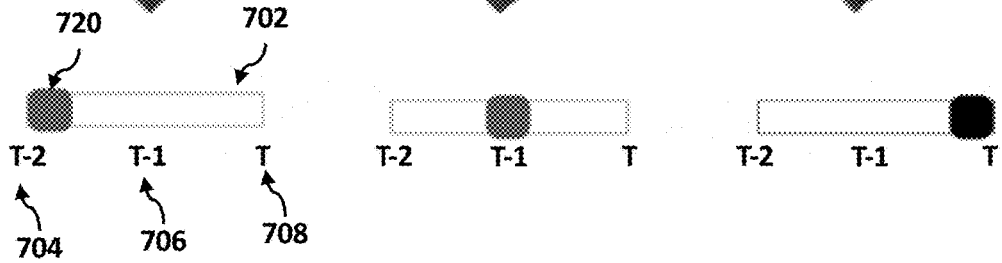

Referring now to FIG. 7, an exemplary block diagram illustrating a historical feedback tracking UI 700 implemented by the feedback program 110a, 110b according to at least one embodiment is depicted.

According to one embodiment, the feedback program 110a, 110b may build a feedback timeline 702 including a first date 704 (e.g., T-2) corresponding to the oldest feedback, a second date 706 corresponding to the newest feedback (e.g., T), and a third date 708 corresponding to an intermediate feedback (e.g., T-1).

According to one embodiment, the historical feedback tracking UI 700 may provide a user image-based 3-D pictorial model 710 of a product feature as shown in FIG. 7. The feedback program 110a, 110b may generate the user image-based 3-D pictorial model 710 using one or more images received from the user device on the respective dates (e.g., first date, second date, third date).

According to one embodiment, the user image-based 3-D pictorial model 710 may include a first state 712 for visualizing the user image-based 3-D pictorial model 710 based on the oldest (e.g., earliest) image received from the user. It is contemplated that the first state may represent the product at a point in time closest to a purchase date (e.g., when it was relatively new). In one embodiment, the user image-based 3-D pictorial model 710 may include a second state 714 for visualizing the user image-based 3-D pictorial model 710 based on the newest (e.g., most recent or current) image received from the user. It is contemplated that the second state may represent the product at a point in time farthest from time purchase date. In one embodiment, the user image-based 3-D pictorial model 710 may include a third state 716 for visualizing the user image-based 3-D pictorial model 710 based on an intermediate (e.g., between the earliest and the most recent or current) image received from the user.

According to one embodiment, the feedback program 110a, 110b may link the user image-based 3-D pictorial model 710 to the feedback timeline 702, as described previously with reference to FIG. 4. According to one embodiment, the feedback program 110a, 110b may also provide a version history 718 associated with the user image-based 3-D pictorial model 710. In the example illustrated in FIG. 7, the user may select version 1 from the version history 718. Then, in response to the user interacting with the feedback timeline 702 (e.g., using a selectable sliding tool 720) and selecting the first date 704 on the feedback timeline 702, the feedback program 110a, 110b may render the user image-based 3-D pictorial model 710 visualize the first state 712 of the user image-based 3-D pictorial model 710. Then, in response to the user moving the selectable sliding tool 720 to select the third date 706 on the feedback timeline 702, the feedback program 110a, 110b may dynamically render the user image-based 3-D pictorial model 710 visualize the third state 716 (e.g., intermediate state) of the user image-based 3-D pictorial model 710. Thereafter, in response to the user moving the selectable sliding tool 720 to select the second date 708 on the feedback timeline 702, the feedback program 110a, 110b may dynamically render the user image-based 3-D pictorial model 710 visualize the second state 716 (e.g., current state) of the user image-based 3-D pictorial model 710.

Accordingly, the historical feedback tracking UI 700 may enable the user to see how a specific version of a product feature (e.g., a drill head in FIG. 7) may decayed over a time period using crowdsourced information (e.g., image data) from users.

The functionality of a computer may be improved by the feedback program 110a, 110b because the feedback program 110a, 110b may enable a computer to provide a way to aggregate user feedback which identify specific features of a product and visualize the aggregated feedback by rendering the feedback on pictorial representations of the product. The functionality of a computer may also be improved by the feedback program 110a, 110b because the feedback program 110a, 110b may enable a computer to provide a UI to enable a user to interact with a pictorial representation of the product to extract user feedback corresponding to specific features of the product. The functionality of a computer may also be improved by the feedback program 110a, 110b because the feedback program 110a, 110b may enable a computer to provide the UI to enable the user to interactively define a feature of the product on the pictorial representation of the product and associate a user feedback with the user-defined feature of the product.

It may be appreciated that FIGS. 2 to 7 provide only an illustration of one embodiment and do not imply any limitations with regard to how different embodiments may be implemented. Many modifications to the depicted embodiment(s) may be made based on design and implementation requirements.

Figure 8:
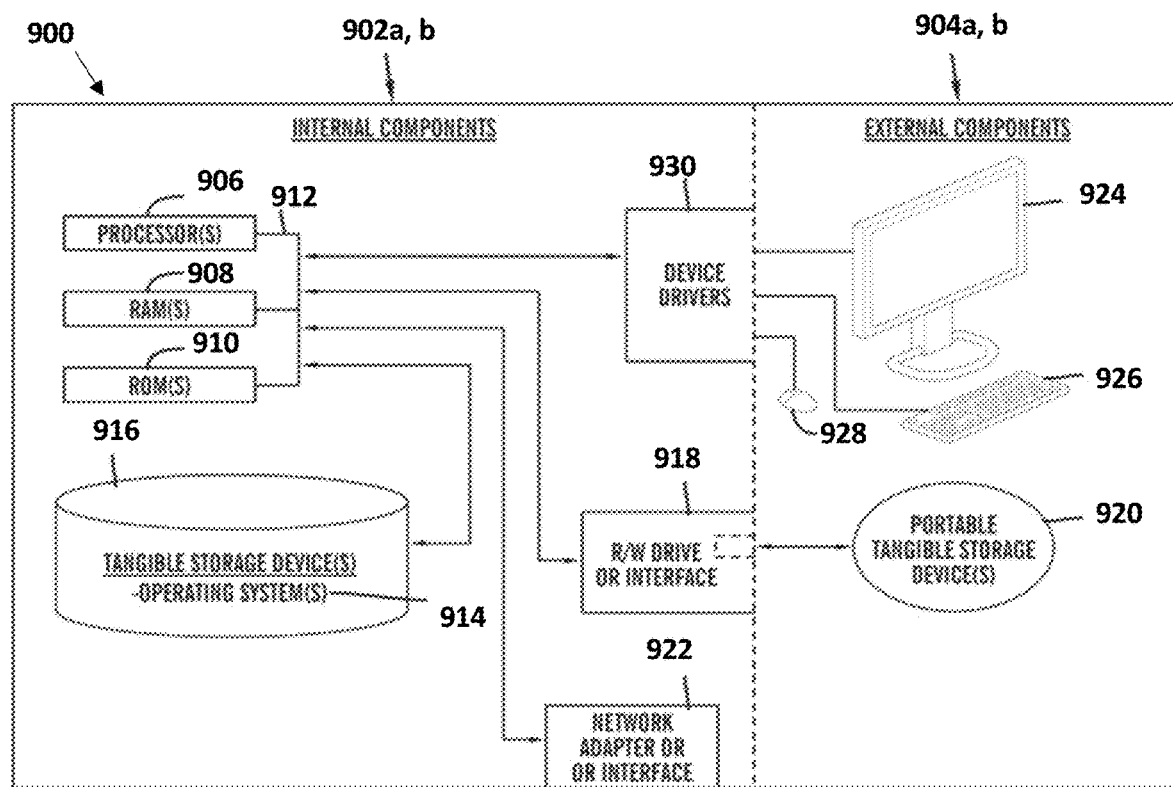
FIG. 8 is a block diagram of internal and external components of computers and servers depicted in FIG. 1 according to at least one embodiment.

FIG. 8 is a block diagram 900 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 8. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the feedback program 110a in client computer 102, and the feedback program 110b in network server 112, may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the feedback program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the feedback program 110a in client computer 102 and the feedback program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the feedback program 110a in client computer 102 and the feedback program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
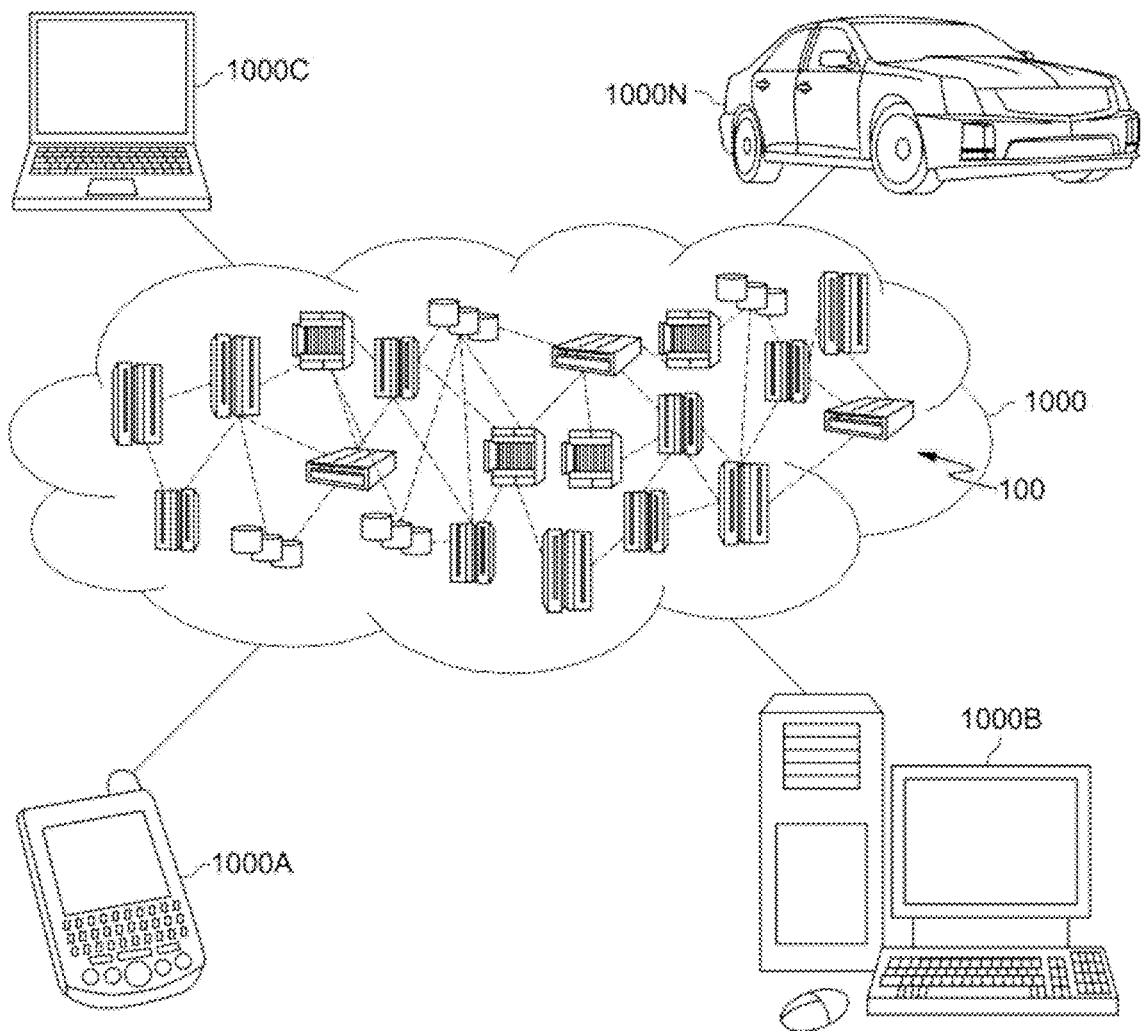
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 10:
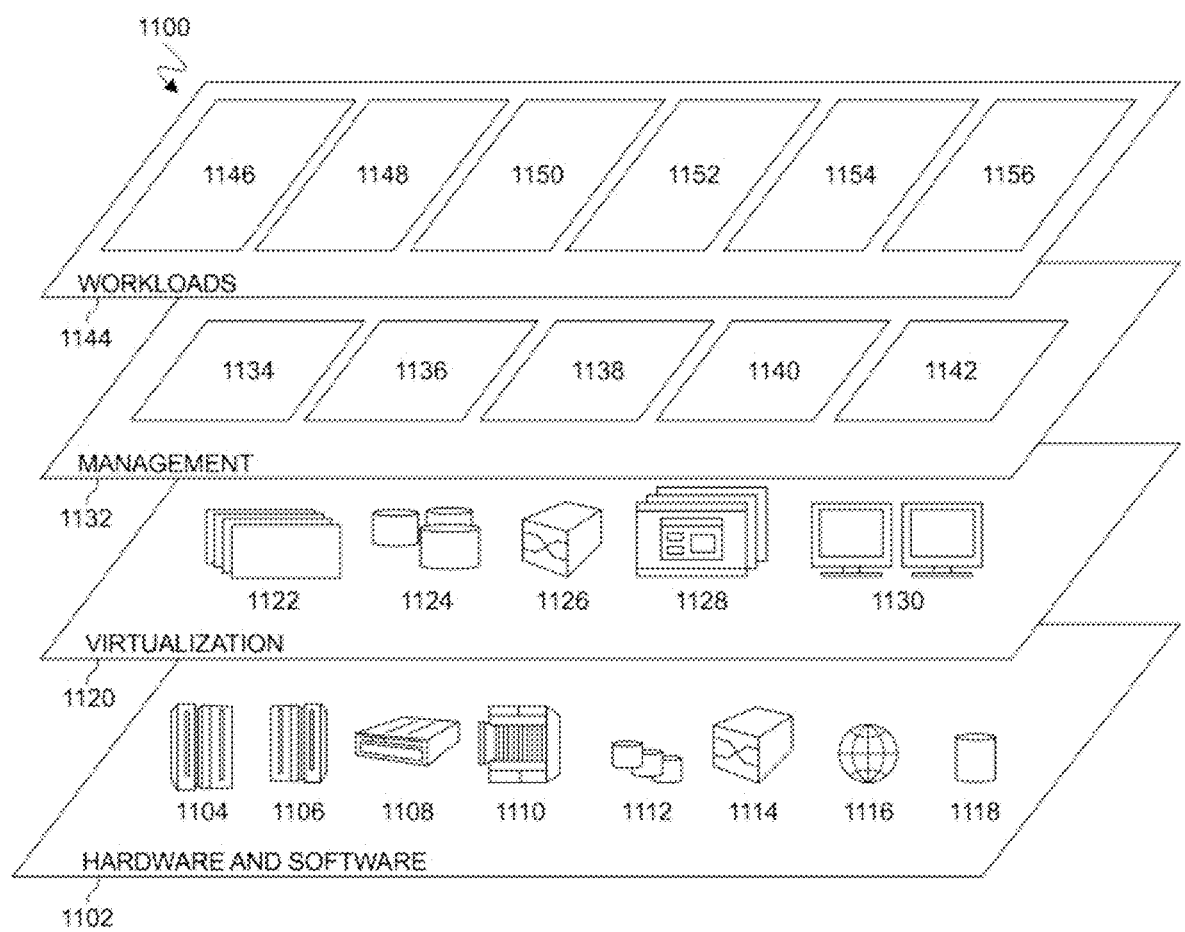
FIG. 10 is a block diagram of functional layers of the illustrative cloud computing environment of FIG. 9, in accordance with an embodiment of the present disclosure.

Referring now to FIG. 10, a set of functional abstraction layers 1100 provided by cloud computing environment 1000 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and feedback visualization 1156. A feedback program 110*a*, 110*b* provides a way to visually render user feedback onto a pictorial representation of a product in a location proximate a user-defined product feature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining a first date corresponding to an oldest received feedback including at least one first image of a product;
   determining a second date corresponding to a newest received feedback including at least one second image of the product;
   building a feedback timeline including the first date of the oldest feedback and the second date of the newest feedback;
   rendering a product representation of the product based on the at least one first image and the at least one second image;
   registering a user-defined product feature associated with the rendered product representation;
   receiving a textual statement corresponding to a user opinion of the user-defined product feature; and
   associating, based on natural language processing, at least one segment of the received textual statement with the registered user-defined product feature.

2. The method of claim 1, wherein registering the user-defined product feature associated with the rendered product representation further comprises:
   receiving, from the user device, a pixel selection in a retail product image corresponding to the rendered product representation;
   registering the received pixel selection as the user-defined product feature.

3. The method of claim 1, further comprising:
   calculating a feedback rating value corresponding to the registered user-defined product feature based on sentiment analysis of the received textual statement.

4. The method of claim 1, further comprising:
   calculating a statistical accumulation of a plurality of feedback rating values corresponding to the registered user-defined product feature; and
   determining an aggregated feedback rating value for the registered user-defined product feature based on the calculated statistical accumulation.

5. The method of claim 1, wherein rendering the product representation of the product based on the at least one first image and the at least one second image further comprises:
   generating the product representation based on the at least one first image and the at least one second image; and
   linking the generated product representation to the feedback timeline.

6. The method of claim 5, wherein the generated product representation includes a first state for visualizing the generated product representation based on the at least one first image; and
   wherein the generated product representation includes a second state for visualizing the generated product representation based on the at least one second image.

7. The method of claim 6, further comprising:
   in response to receiving a first date selection on the feedback timeline from the user device, displaying the generated product representation in the first state.

8. The method of claim 7, further comprising:
   in response to receiving a second date selection on the feedback timeline from the user device, dynamically transitioning the generated product representation from displaying the first state to displaying the second state of the generated product representation.

9. A computer system for user feedback visualization, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   determining a first date corresponding to an oldest received feedback including at least one first image of a product;
   determining a second date corresponding to a newest received feedback including at least one second image of the product;
   building a feedback timeline including the first date of the oldest feedback and the second date of the newest feedback;
   rendering a product representation of the product based on the at least one first image and the at least one second image;
   registering a user-defined product feature associated with the rendered product representation;
   receiving a textual statement corresponding to a user opinion of the user-defined product feature; and
   associating, based on natural language processing, at least one segment of the received textual statement with the registered user-defined product feature.

10. The computer system of claim 9, wherein registering the user-defined product feature associated with the rendered product representation further comprises:

receiving, from the user device, a pixel selection in a retail product image corresponding to the rendered product representation;

registering the received pixel selection as the user-defined product feature.

11. The computer system of claim 9, further comprising:

calculating a feedback rating value corresponding to the registered user-defined product feature based on sentiment analysis of the received textual statement.

12. The computer system of claim 9, further comprising:

calculating a statistical accumulation of a plurality of feedback rating values corresponding to the registered user-defined product feature; and determining an aggregated feedback rating value for the registered user-defined product feature based on the calculated statistical accumulation.

13. The computer system of claim 9, wherein rendering the product representation of the product based on the at least one first image and the at least one second image further comprises:

generating the product representation based on the at least one first image and the at least one second image; and linking the generated product representation to the feedback timeline.

14. The computer system of claim 13, wherein the generated product representation includes a first state for visualizing the generated product representation based on the at least one first image; and wherein the generated product representation includes a second state for visualizing the generated product representation based on the at least one second image.

15. The computer system of claim 14, further comprising:

in response to receiving a first date selection on the feedback timeline from the user device, displaying the generated product representation in the first state.

16. The computer system of claim 15, further comprising:

in response to receiving a second date selection on the feedback timeline from the user device, dynamically transitioning the generated product representation from displaying the first state to displaying the second state of the generated product representation.

17. A computer program product for user feedback visualization, comprising:

one or more computer-readable storage media and program instructions collectively stored on the one or more computer-readable storage media, the program instructions executable by a processor to cause the processor to perform a method comprising:

determining a first date corresponding to an oldest received feedback including at least one first image of a product;

determining a second date corresponding to a newest received feedback including at least one second image of the product;

building a feedback timeline including the first date of the oldest feedback and the second date of the newest feedback;

rendering a product representation of the product based on the at least one first image and the at least one second image;

registering a user-defined product feature associated with the rendered product representation;

receiving a textual statement corresponding to a user opinion of the user-defined product feature; and associating, based on natural language processing, at least one segment of the received textual statement with the registered user-defined product feature.

18. The computer program product of claim 17, wherein registering the user-defined product feature associated with the rendered product representation further comprises:

receiving, from the user device, a pixel selection in a retail product image corresponding to the rendered product representation;

registering the received pixel selection as the user-defined product feature.

* * * * *